United States Patent [19]

Miyanaga et al.

[11] Patent Number: 5,490,897
[45] Date of Patent: Feb. 13, 1996

[54] TIRE FORMER CAPABLE OF EXPANDING AND CONTRACTING IN AN AXIAL DIRECTION

[75] Inventors: Yoshinobu Miyanaga; Kenji Mishima, both of Shirakawa, Japan

[73] Assignee: Sumitomo Rubber Industries, Ltd., Japan

[21] Appl. No.: 271,915

[22] Filed: Jul. 8, 1994

[30] Foreign Application Priority Data

Jul. 14, 1993 [JP] Japan .................................. 5-174402

[51] Int. Cl.$^6$ ................................... B29D 30/24
[52] U.S. Cl. ............................. 156/415; 156/419
[58] Field of Search ................................ 156/415, 414, 156/416–420

[56] References Cited

U.S. PATENT DOCUMENTS

| | | |
|---|---|---|
| 2,039,531 | 5/1936 | Heston . |
| 3,188,260 | 6/1965 | Nebout ..................................... 156/415 |
| 3,784,437 | 1/1974 | Appleby et al. . |
| 4,206,010 | 6/1980 | Gutknecht ............................... 156/415 |
| 4,220,494 | 9/1980 | Kawaida et al. . |
| 4,402,783 | 9/1983 | Enders . |
| 5,268,057 | 12/1993 | Nojiri et al. ............................. 156/415 |

FOREIGN PATENT DOCUMENTS

| | | |
|---|---|---|
| 0432993 | 6/1991 | European Pat. Off. . |
| 1218146 | 6/1966 | Germany . |
| 2705504 | 8/1978 | Germany . |

*Primary Examiner*—Geoffrey L. Knable
*Attorney, Agent, or Firm*—Birch, Stewart, Kolasch & Birch

[57] ABSTRACT

A tire former for use in a tire building apparatus, the tire former includes a center ring provided coaxially around a drum shaft and a pair of side rings provided coaxially around the drum shaft and on opposite sides of the center ring. The center ring consists of a plurality of circumferentially separatable ring segments. The side rings are movable closer to and away from each other along the shaft to selectively provide an axially expanded state where the side rings are positioned on opposite sides of the center ring and an outer circumferential surface of the side rings is flush with an outer circumferential of the center ring; and an axially contracted state where the side rings are positioned radially inside of the center ring.

8 Claims, 5 Drawing Sheets

TIRE FORMER CAPABLE OF EXPANDING AND CONTRACTING IN AN AXIAL DIRECTION

BACKGROUND OF THE INVENTION

This invention relates to a tire former for use in a tire building apparatus.

There has been known a tire building apparatus as shown in FIG. 4. In FIG. 4, a tire building apparatus 10 is provided with a tire former 12, a tread ring forming drum 14, and a transfer for transferring a tread ring to the tire former 12 from the tread ring forming drum 14. Specifically, cylindrical carcass plies are formed on the tire former 12 and bead wires are put on side ends of the carcass plies on the tire former 12. On the other hand, a tread ring is formed on the drum 14, and then transferred to the tire former 12 by the transfer 16. When the tread ring is positioned around the carcass plies on the tire former 12, the tire former 12 is axially contracted to deform the carcass plies into a toroidal shape. An outer surface of the toroidal carcass plies adheres an inner surface of the tread ring. In this way, a green tire is formed.

As shown in FIG. 5, the tire former 12 is conventionally provided with a center ring 20 and a pair of side rings 22 which are provided at opposite sides of the center ring 20. The side rings 22 are mounted on a drum shaft 18 and movable closer to and away from each other along an axial direction of the drum shaft 18.

The outer diameter of each side ring 22 is set such that an outer circumferential surface of the side ring 22 comes slidably in contact with an inner circumferential surface of the center ring 20. When the side rings 22 move closer to each other from the positions shown in FIG. 5, i.e., in directions of arrow in FIG. 5, they are consequently located inside the center ring 20. In this way, the tire former 12 changes from a wide drum stage shown in FIG. 5 to a narrow drum stage in which the side rings 22 are located inside the center ring 20.

More specifically, a green tire is built with the above tire building apparatus as follows. First, after carcass plies 26 are placed over the outer circumferential surface of the tire former 12 in the wide drum stage. Bead wires 30 including a bead apex 28 are placed at opposite outer ends of the carcass plies 26. Subsequently, an unillustrated bladder of a bead locking device 24 provided at an outer end of each side ring 22 is inflated, and opposite ends 32 of the carcass plies 26 are, as shown in FIG. 5, turned up to cover the bead wires 30. Thereafter, the side rings 22 are moved closer to each other to change the tire former 12 into the narrow drum stage, and air is supplied between the center ring 20 and the tire carcass, with the result that the tire carcass is expanded radially and deformed into a toroidal shape as indicated by the dotted line in FIG. 5.

In such conventional tire former 12, however, there are stepped portions A between the center ring 20 and the two side rings 22 in the initial state of the tire former 12, i.e., in the wide drum stage, as shown in FIG. 5. This because the outer diameters of the side rings 22 and the center ring 20 differ. In other words, the cylindrical carcass plies 26 are formed with annular stepped portions corresponding to the stepped portions A. This makes it difficult to form the carcass plies 26 into a shape of a uniform cylinder, for that matter, greatly influences the quality of the tire product. Further, the carcass plies 26 are normally obtained by adhering two or more different kinds of materials one on another. For instance, when two kinds of materials are adhered to form the carcass plies 26, a final tire product may be defective because air remains between these two materials due to the presence of the stepped portion A. Accordingly, it is necessary to remove the air remaining in the carcass plies 26 in a tire building process.

It will be seen that if the materials are adhered in an endless manner to form carcass plies without accompanying any stepped portions in the tire forming step, the air does not remain between these materials. This will eliminate the air removing operation which has been conducted in the conventional apparatus, and increase the working efficiency.

Also, the center ring 20 of the conventional tire former is made of a single ring-shaped member as well as the side rings 22. Accordingly, when the center ring 20 is replaced to change the width of tire former for formation of a different type of tire, it has been necessary to remove not only the center ring 20 but also one of the side rings 22 and bead locking devices coupled therewith from the drum shaft. Such replacement operation requires an exceedingly large amount of labor and time.

SUMMARY OF THE INVENTION

It is an object of the present invention to provide a tire former for use in a tire building apparatus which has overcome the above-mentioned problems.

It is another object of the present invention to provide a tire former which can provide a wide drum stage in which side rings are located in respective axially expanded positions and outer circumferential surfaces of the side rings are flush with that of a center ring, and a narrow drum stage in which the side rings are located inside the center ring.

It is another object of the present invention to provide a tire former which enables easy replacement of a center ring to change the width of tire former.

Accordingly, the present invention is directed to a tire former for use a tire building apparatus, the tire former comprising: a shaft; a center ring provided coaxially around the shaft and radially expandable; a pair of side rings provided coaxially around the shaft, the side rings being movable closer to and away from each other along the shaft to selectively provide: an axially expanded state where the side rings are positioned on opposite sides of the center ring and an outer circumferential surface of the side rings is flush with an outer circumferential of the center ring; and an axially contracted state where the side rings are positioned radially inside of the center ring.

The center ring may be constructed by a plurality of ring segments separatable from one another in a circumferential direction of the center ring, the plurality of ring segments being biased in a direction of radially contracting.

It may be appreciated that each ring segment is formed with slanting surfaces on opposite side ends thereof, the slanting surface being formed in such a way that the wall thickness of the ring segment becomes smaller at a more axially outward position; the side rings each are formed with a slanting surface on an inward side end thereof, the slanting surface being formed in such a way as to meet the slanting end surface of the ring segment in the axially expanded state; whereby the side rings are axially moved toward the inside of the center ring along the respective slanting end surfaces.

The side ring may be further formed with a supporting portion on a more inward end than the slanting end surface for supporting the ring segments in the axially expanded state.

Further, the side ring may be provided with a bead locking device on an axially outward end thereof.

It may be preferable to provide a pair of sliders slidably mounted on the shaft for supporting the pair of side rings respectively; and guide means provided between the pair of sliders for guiding the axial movement of the pair of side rings.

The guide means may be constructed by a stationary rod extending in parallel with the shaft and having a first block and a second block on opposite ends thereof; a first rod attached on one slider and extending in parallel with the shaft, the first rod passing through the first block for slidably supporting the first block; and a second rod attached on the other slider and extending in parallel with the shaft, the second rod passing through the second block for slidably supporting the second block.

Further, it may be appreciated to provide a stationary member fixedly attached one of the first and second blocks; and connector means provided between the stationary member and the ring segment for connecting the ring segment with the stationary member.

It may be preferable that the first and second blocks are removable from the first and second rods respectively.

Moreover, the connector means may be constructed by a projection provided on a free end of the stationary member; a block fixedly attached on an inner surface of the ring segment, the block being formed with a hole engageable with the projection; and spring provided between the stationary member and the block for urging the ring segment in a radial inner direction.

It may be more preferable that the block attached on the ring segment is removable from the stationary member.

In the tire former thus constructed, the outer circumferential surface of the center ring is flush with those of the side rings when the tire former is in a wide drum stage, i.e., in the axially expanded state where the center ring is held between the two side rings. Accordingly, no stepped portion is formed on the outer circumferential surface of the tire former, and materials supplied to form a carcass can be adhered sealably one over another, eliminating the undesirable likelihood that air remains between the materials.

When the side rings are moved closer to each other, the center ring is pressed from the axially outer ends by these side rings. This pressing force causes the ring segments constituting the center ring to move radially outward along the radially inward slanting faces formed at the axially inner ends of the side rings, and the center ring is brought into its radially expanded state. When the side rings are further moved, the side rings are located inside the center ring having radially expanded and the tire former is brought into a narrow drum stage, i.e., the axially contracted state.

When the side rings are moved away from each other after the tire is formed, the ring segments of the center ring are moved radially inward by the biasing forces from the biasing members. Thus, the center ring is returned into its radially contracted state and the tire former is returned to the axially expanded state.

These and other objects, features and advantages of the present invention will become more apparent upon a reading of the following detailed description and accompanying drawings.

DETAILED DESCRIPTION OF THE PREFERRED EMBODIMENT OF THE INVENTION

A tire former of the invention will be described with reference to FIGS. 1 to 3. It will be noted that a tire building apparatus incorporating the tire former of the invention is basically identical to the tire building apparatus shown in FIG. 4 except for the tire former.

Figure 1:
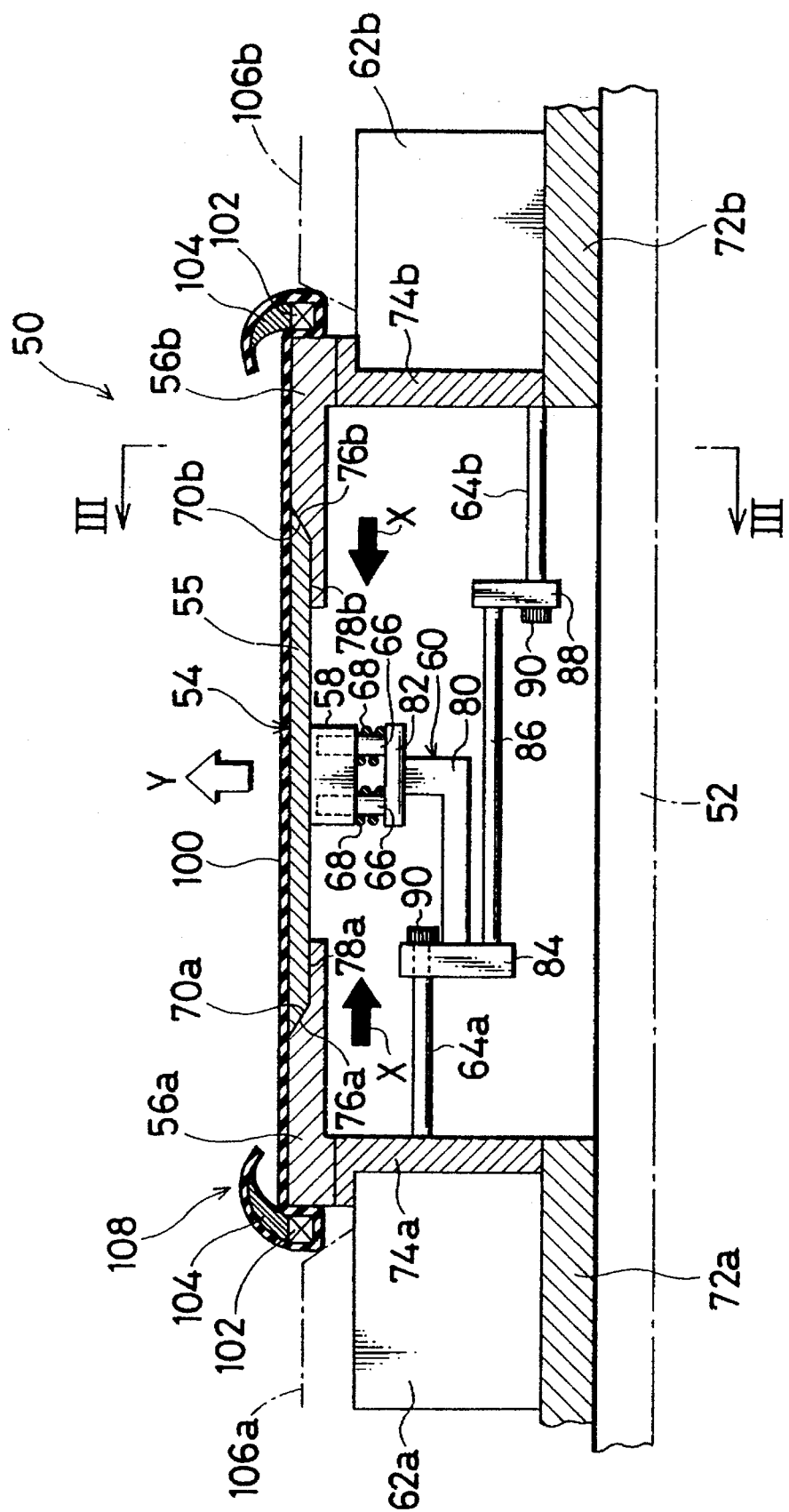
FIG. 1 is a schematic diagram in section showing an inventive tire former for use in a tire building apparatus in an axially expanded state.

As shown in FIG. 1, a tire former 50 of the invention is provided with a drum shaft 52, a center ring 54 mounted on the drum shaft 52, and a pair of side rings 56a and 56b mounted on the drum shaft 52 at opposite sides of the center ring 54 with respect to an axial direction of the drum shaft 52 (hereinafter, referred to merely as "axial direction").

The side rings 56a, 56b are each a drum member having the same outer diameter as the center ring 54. An inner end portion of each side ring has a stepped and tapered structure. More specifically, as shown in FIG. 1, the inner end portions of the side rings 56a, 56b are formed with slanting faces 76a, 76b which slope toward a shaft center and cylindrical portions 78a, 78b which extend inward in parallel with the drum shaft 52 from the slanting faces 76a, 76b and have an outer diameter smaller than outer flat surfaces of the side rings 56a, 56b, respectively.

The side rings 56a, 56b are mounted on the drum shaft 52 by way of flanges 74a, 74b and sleeves 72a, 72b respectively, and are driven by an unillustrated drive device along the drum shaft 52 closer to and away from each other. At the outer ends of the side rings 56a and 56b are provided bead locking devices 62a and 62b, although not shown in detail.

Figure 3:
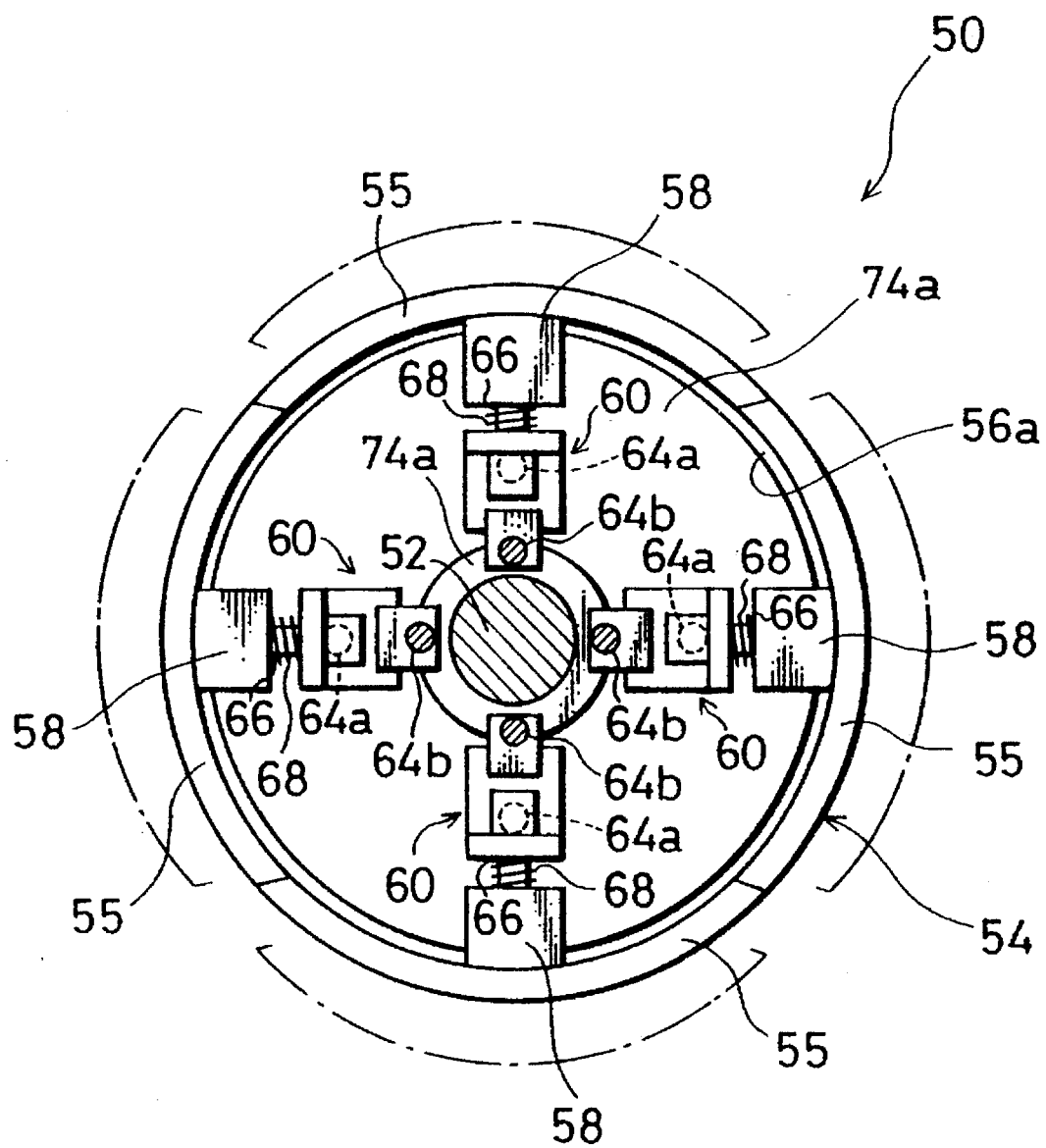
FIG. 3 is a sectional view taken along the line III—III in FIG. 1.
Figure 4:
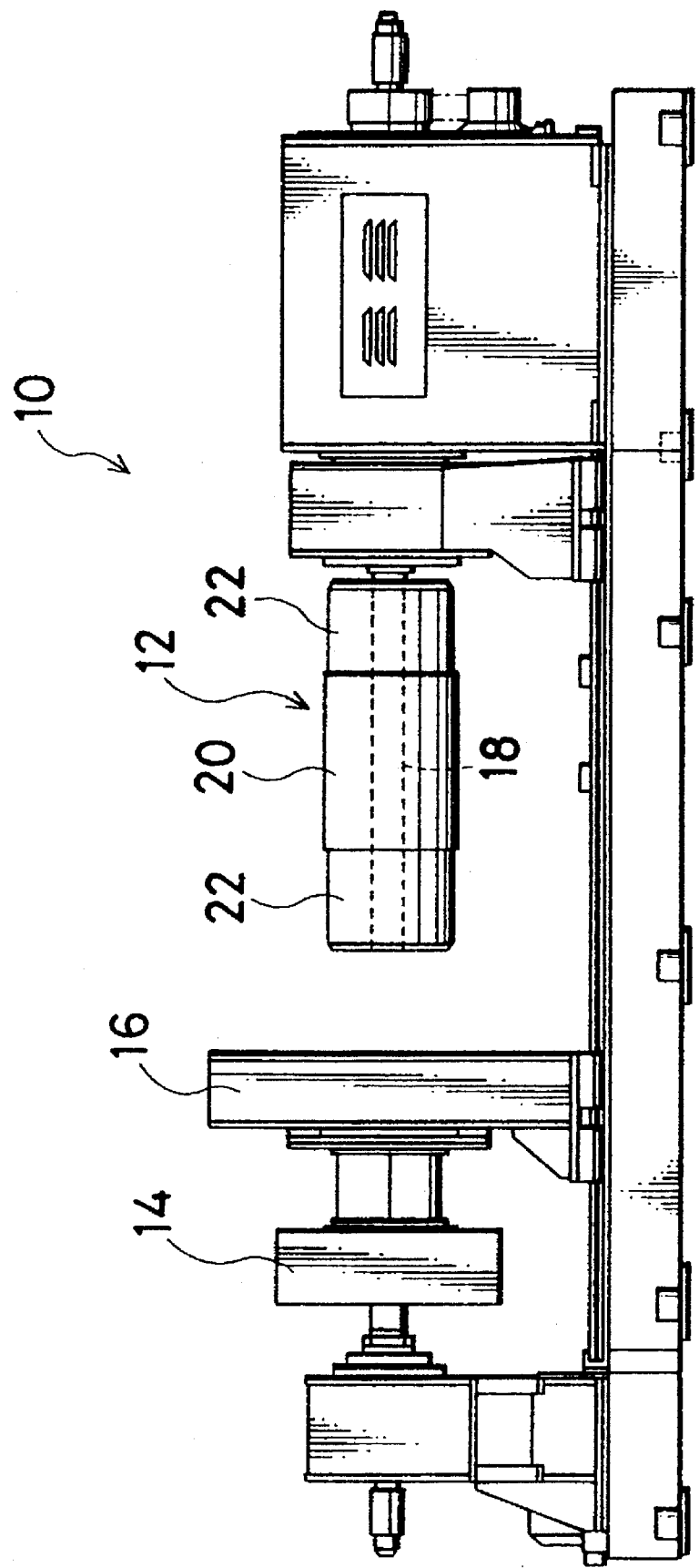
FIG. 4 is a front elevation view showing an overall construction of a tire building apparatus provided with conventional tire former.
Figure 5:
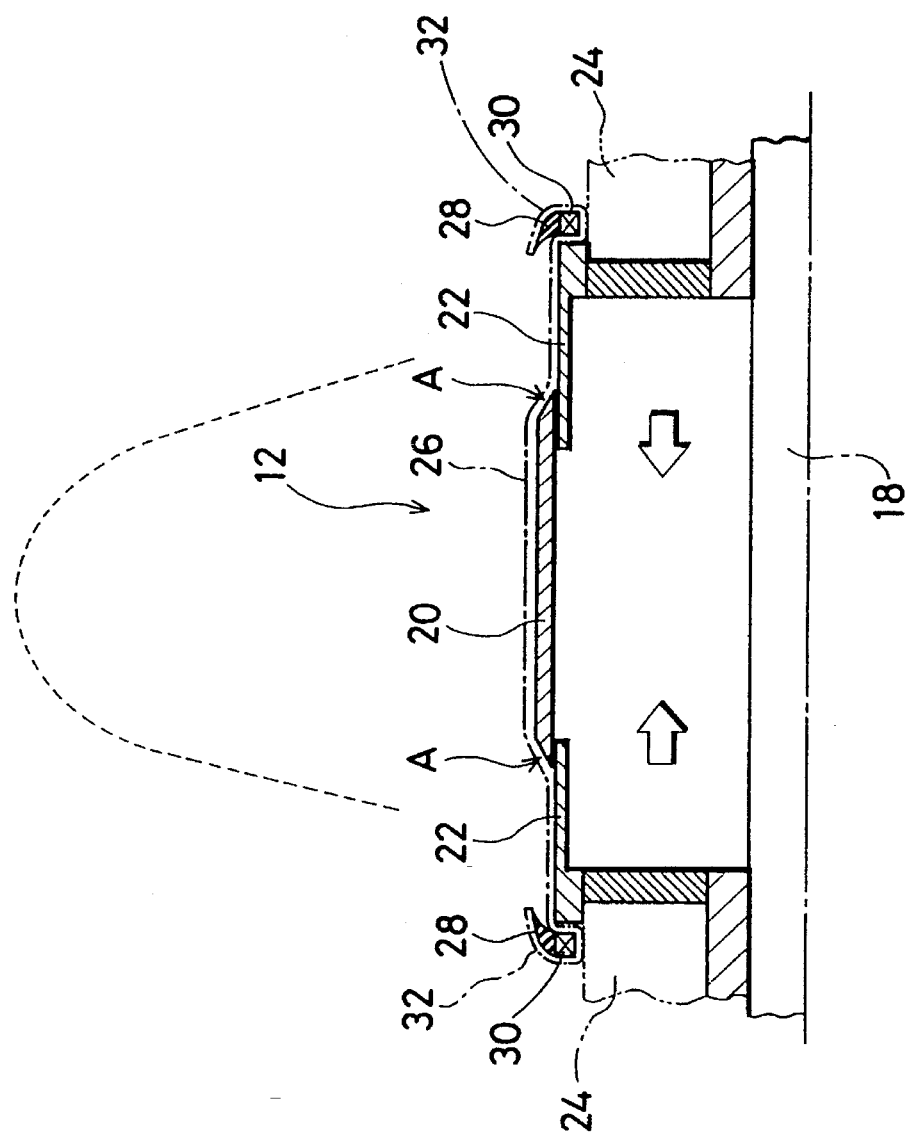
FIG. 5 is a sectional view showing the conventional tire former.

Inside the side ring 56a, there are provided a plurality of slide rods 64a (four slide rods in this embodiment) extending in parallel with the drum shaft 52 and circumferentially spaced apart at specified intervals as shown in FIGS. 1 and 3. The slide rods 64a are fixedly attached on the flange 74a.

Inside the side ring 56b as well, the same number of slide rods 64b extending in parallel with the drum shaft 52 are fixedly attached on the flange 74b. The slide rods 64b are opposed to the corresponding slide rods 64a and located closer to the shaft center than them.

The corresponding slide rods 64a and 64b which are opposed to each other are coupled by way of a coupling member 60. Each coupling member 60 is, as shown in FIG. 1, an L-shaped stationary member 80 including a supporting portion 82 facing the inner circumferential surface of the center ring 55 and a block 84 facing the flange 74a. On the block 84 is secured a stationary rod 86 extending toward the flange 74b in parallel with the drum shaft 52. At a leading end of the stationary rod 86 is provided a block 88. Further, the supporting portion 82 are formed with a pair of rods 66 projecting in radial direction. These rods 66 serve as a support of the center ring 55 to be described in detail later.

In each coupling member 60, the slide rod 64a is inserted through an unillustrated opening formed in the block 84 and the slide rod 64b is inserted through an unillustrated opening formed in the block 88. Thus, the coupling member 60 is slidable along the slide rods 64a and 64b the axial direction of the drum shaft 52. At an inner end of each of the slide rods 64a and 64b inserted through the blocks 84 and 88 of the coupling member 60 is mounted a stopper 90 for keeping the slide rod 64a (64b) from moving away from the coupling member 60.

As shown in FIG. 3, the center ring 54 is a drum member formed of a plurality of separate center plates (four plates in this embodiment) which are circumferentially arranged. This center ring 54 has a thickness smaller than the respective side rings 56a, 56b, and is formed, at outer ends of the inner circumferential surface, with slanting faces 70a, 70b which slope radially outward in the corresponding axially outward directions.

As shown in FIG. 1, the center ring 54 is held between the side rings 56a, 56b in an expanded state of the tire former 50. In this state, the opposite outer end portions of the center ring 54 are externally fitted on the cylindrical portions 78a, 78b of the side rings 56a, 56b and the slanting faces 70a, 70b formed thereat are engaged with the slanting faces 76a, 76b formed at the inner ends of the side rings 56a, 56b respectively. Further, the outer circumferential surface of the center ring 54 is flush with those of the side rings 56a and 56b.

A block 58 is provided on the inner circumferential surface of each center plate 55 of the center ring 54. In each block 58 is formed a pair of guide holes which are opened in a radial direction and juxtaposed in the axial direction. In these guide holes are slidably inserted the corresponding rods 66 projecting from the supporting portion 82 of each coupling member 60. The corresponding block 58 and supporting portion 82 are coupled by way of a contraction spring 68, with the result that the corresponding center plate 55 and coupling member 60 are connected with each other and each center plate 55 is biased toward the center of the drum shaft 52.

There will be next described operations of the tire former 50 constructed as described above.

When the tire forming operation is started in the tire former 50, the side rings 56a and 56b are in their reference positions, i.e., in the state where the center ring 54 is held between the side rings 56a and 56b and the outer circumferential surface thereof is flush with those of the side rings 56a and 56b as shown in FIG. 1.

Upon the start of the tire forming operation, carcass plies 100 are placed on the outer circumferential surface of the tire former 50 and formed into a cylindrical shape. Since the outer circumferential surfaces of the center ring 54 and the side rings 56a, 56b are flush with each other, the cylindrically formed carcass plies 100 have no stepped portion.

Thereafter, bead wires 102 each having a bead apex 104 placed at outer ends of the carcass plies 100 and the unillustrated bladders of the bead locking devices 62a, 62b are inflated. As a result, the opposite ends of the carcass plies 100 are turned up at the bead wires 102 as shown in FIG. 1, thereby forming a tire carcass 108.

Upon the formation of the tire carcass 108, locking members 106a and 106b of the bead locking devices 62a and 62b are drivingly moved radially outward to tightly hold the opposite ends of the tire carcass 108, i.e., the bead portions thereof, and the side rings 56a, 56b of the tire former 50 are moved closer to each other in the directions represented by the arrows X in FIG. 1. In synchronism with the movement of the side rings 56a, 56b, air is supplied from the inner circumferential surface of the tire carcass 108.

At this time, the side rings 56a, 56b which move closer to each other press the axially outer ends of the center plates 55 of the center ring 54. This pressing forces causes the center plates 55 to move radially outward, that is, the direction represented by the white arrow Y in FIG. 1, along the ends of the side rings 56a, i.e., the slanting faces 76a and 76b thereof. When the inner ends of the side rings 56a, 56b finally come into contact with the blocks 58 of the respective center plates 54, the center plates 54 are completely located on the outer circumferential surfaces of the side rings 56a, 56b. In other words, the side rings 56a, 56b are located inside the center ring 54.

Figure 2:
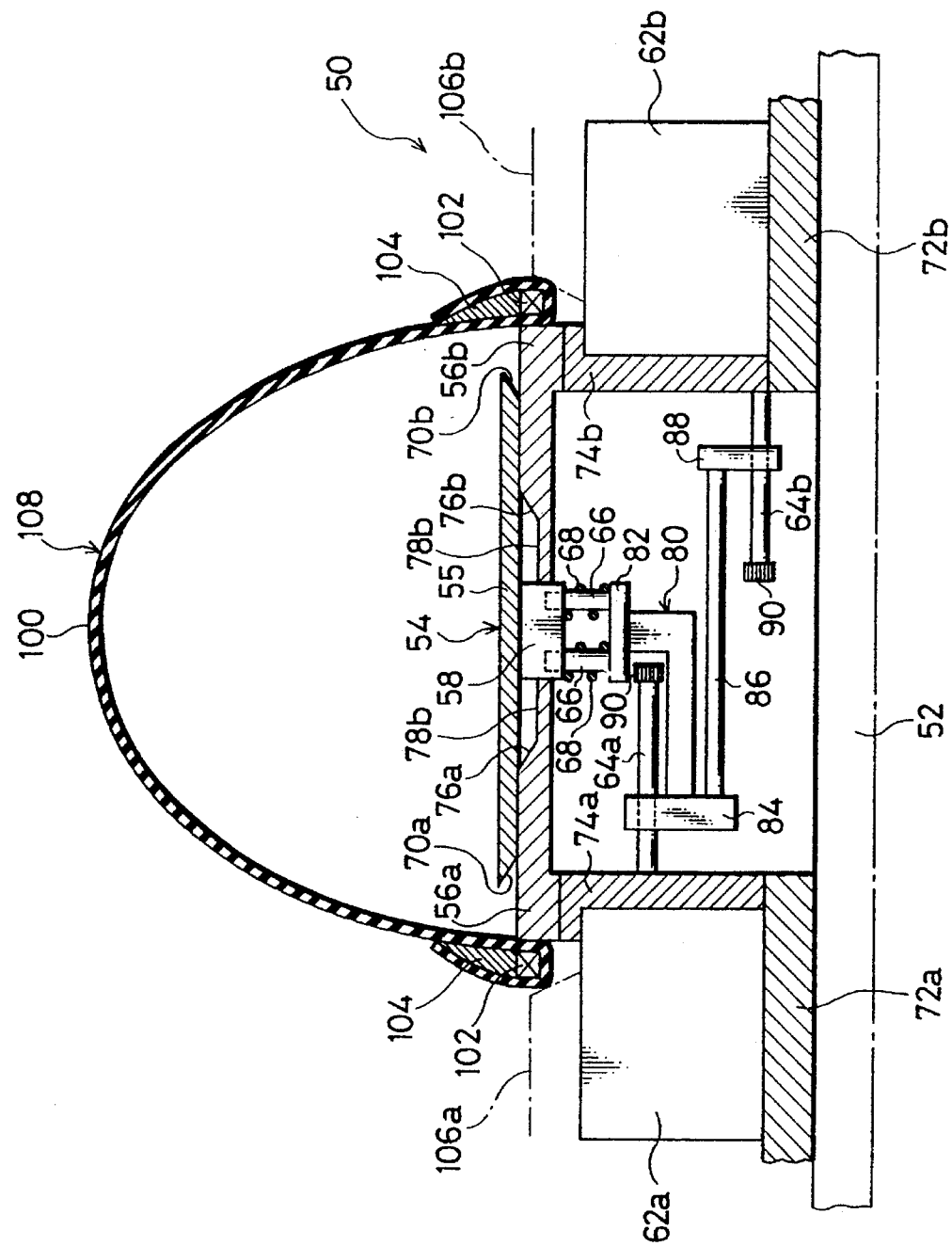
FIG. 2 schematic diagram in section showing the tire former in an axially contracted state.

When the side rings 56a, 56b are located at their axially innermost positions inside the center ring 54, the tire carcass 108 is completely expanded and deformed into a toroidal shape as shown in FIG. 2. A tread ring is transferred and adhered to the outer circumferential surface of the tire carcass 108, thereby forming a green tire. The green tire thus formed is subsequently removed from the tire former 50 and transferred to a next shaping process.

The side rings 56a, 56b are moved away from each other in the tire former 50 from which the green tire is removed. Since the center plates 55 are biased toward the shaft center by the biasing forces from the contraction springs 68, they move radially inward along the slanting faces 76a, 76b as the side rings 56a, 56b move axially outward. Consequently, the center ring 54 is returned to its original radially contracted state from the radially expanded state and the tire former 50 is reset to the initial state shown in FIG. 1.

As described above, in the tire former 50 according to the invention, the outer circumferential surface of the center ring 54 is flush with those of the side rings 56a, 56b in the initial wide drum stage. When the tire carcass 108 is expanded and deformed into a toroidal shape; the center plates 55 of the center ring 54 are pressed out radially by moving the side rings 56a, 56b closer to each other, thereby bringing the center ring 54 into the radially expanded state in which the side rings 56a, 56b are located inside the ring 54. Accordingly, the tire carcass 108 can be formed without accompanying any stepped portion in the carcass plies 100. Thus, unlike the conventional tire former, the tire former of the invention is free from the undesirable event where air remains between materials due to the stepped portion formed in the carcass plies, which results in a defective tire product. This obviates the need for an operation of removing the air remaining between the materials, thereby improving the working efficiency in the tire manufacturing.

Since the center ring 54 is formed of a plurality of separable center plates 55 and each center plate 55 is mounted on the corresponding slide rods 64a, 64b by way of the coupling member 60, it is very easy, for example, to replace the center ring 54 to change the width of tire former for manufacturing of a tire having a different width. Specifically, the center plates 55 are individually dismounted from the coupling members 60. The coupling members 60 are dismounted from the slide rods 64a, 64b by removing the stoppers 90 from the leading ends of the slide rods 64a, 64b. Thereafter, center plates and coupling members suitable for a different type of tire are mounted in an order opposite from the above. In this way, the tire former of the invention can easily cope with the manufacturing of tires having different widths. Compared with the conventional tire former which includes the center ring of a single member and needs long replacement labor and time, the tire former of the invention is capable of reducing the time and labor required for the center ring replacement operation.

Also, it will be appreciated to provide coupling members operable for formation of different types of tire. This will omit the replacement of coupling members, and make the width changing operation easier.

In the foregoing embodiment, each center plate 55 is movable radially outward along the rods 66 of the coupling members 60 inserted in the guide holes formed in the block 58 provided on the inner circumferential surface thereof and is biased toward the shaft center by the biasing force from the contraction spring 68. The corresponding center plate and coupling member 60 may be also slidably coupled by engaging a projection formed with the coupling member 60 and a guide hole formed in the block 58. Further, it may be appreciated to use a plate spring instead of the contraction spring 68. Further, each center plate 55 may be electrically biased toward the shaft center using, for example, an electromagnetic solenoid or the like.

Further in the foregoing embodiment, the slide rods 64a and 64b are provided inside the side rings 56a and 56b and the coupling members 60 are slidably mounted on the corresponding slide rods 64a and 64b. However, the positions and shapes of the coupling members 60 and the slide rods 64a, 64b are not limited to those described in the embodiment, but may be suitably determined depending upon the moving amount of the side rings 56a, 56b or other causes.

Furthermore in the foregoing embodiment, the slide rods 64a and 64b are inserted through the block 84 and 88 of each coupling member 60 to guide the coupling member 60 slidably in the axial direction of the drum shaft 52. However, the guide means for the coupling member 60 is not limited to the one described in the embodiment. For example, the coupling members 60 may be guided using a rail member instead or the slide rods 64a, 64b.

What is claimed is:

1. A tire former for use in a tire building apparatus, the tire former comprising:
    a shaft;
    a center ring provided coaxially around the shaft and radially expandable, wherein the center ring includes a plurality of ring segments separatable from one another in a circumferential direction of the center ring;
    a pair of side rings provided coaxially around the shaft, the side rings being movable closer to and away from each other along the shaft to selectively provide:
        an axially expanded state where the side rings are positioned on opposite sides of the center ring and an outer circumferential surface of the side rings is flush with an outer circumferential of the center ring; and
        an axially contracted state where the side rings are positioned radially inside of the center ring;
    a pair of sliders slidably mounted on the shaft for supporting the pair of side rings respectively; and
    guide means provided between the pair of sliders for guiding the axial movement of the pair of side rings, wherein the guide means is provided for each ring segment, and the guide means includes:
    a stationary rod extending in parallel with the shaft and having a first block and a second block on opposite ends thereof;
    a first rod attached on one slider and extending in parallel with the shaft, the first rod passing through the first block for slidably supporting the first block; and
    a second rod attached on the other slider and extending in parallel with the shaft, the second rod passing through the second block for slidably supporting the second block.

2. A tire former as defined in claim 1 further comprising: for each ring segment,
    a stationary member fixedly attached one of the first and second blocks; and
    connector means provided between the stationary member and the ring segment for connecting the ring segment with the stationary member.

3. A tire former as defined in claim 2 wherein the first and second blocks are removable from the first and second rods respectively.

4. A tire former as defined in claim 2 wherein the connector means includes:
    a projection provided on a free end of the stationary member;
    a block fixedly attached on an inner surface of the ring segment, the block being formed with a hole engageable with the projection; and
    spring provided between the stationary member and the block for biasing the ring segment in an inner direction.

5. A tire former as defined claim 4 wherein the block attached on the ring segment removable from the stationary member.

6. A tire former as defined in claim 1,
    wherein the ring segments are movable in radial directions of the center ring, the tire former further comprising biasing means for biasing the plurality of ring segments in inner directions of the center ring; and
    wherein each ring segment is formed with slanting surfaces on opposite side ends thereof, the slanting surfaces being formed in such a way that the wall thickness of the ring segment becomes smaller at a more axially outward position;
    the side rings each are formed with a slanting surface on an inward side end thereof, the slanting surface being formed in such a way as to meet the slanting end surface of the ring segment in the axially expanded state;
    whereby the side rings are axially moved toward the inside of the center ring along the respective slanting end surfaces.

7. A tire former as defined in claim 6, wherein each of the side rings is further formed with a supporting portion on a more inward end than the slanting end surface for supporting the ring segments in the axially expanded state.

8. A tire former as defined in claim 1, wherein the side rings each are provided with a bead locking device on an axially outward end thereof.

* * * * *